(12) United States Patent
Hollingshead et al.

(10) Patent No.: US 9,278,763 B2
(45) Date of Patent: Mar. 8, 2016

(54) METHOD AND SYSTEM FOR IDENTIFYING FASTENER PLACEMENT ZONES

(71) Applicants: Paul Hollingshead, Longmont, CO (US); Michael Kent, St. Peters, MO (US); Daniel Michael Quick, St. Peters, MO (US)

(72) Inventors: Paul Hollingshead, Longmont, CO (US); Michael Kent, St. Peters, MO (US); Daniel Michael Quick, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 13/741,766

(22) Filed: Jan. 15, 2013

(65) Prior Publication Data

US 2014/0196289 A1   Jul. 17, 2014

(51) Int. Cl.
*B64F 5/00* (2006.01)
*G06F 17/50* (2006.01)
*G06T 19/00* (2011.01)

(52) U.S. Cl.
CPC .......... *B64F 5/0009* (2013.01); *G06F 17/5086* (2013.01); *G06F 2217/12* (2013.01); *G06T 19/00* (2013.01); *Y10T 29/49616* (2015.01); *Y10T 29/49622* (2015.01)

(58) Field of Classification Search
None
See application file for complete search history.

(56) References Cited

U.S. PATENT DOCUMENTS

| | | | |
|---|---|---|---|
| 7,353,609 B2 | 4/2008 | Hollingshead et al. | |
| 7,979,236 B2 | 7/2011 | Wilson et al. | |
| 8,126,688 B2 | 2/2012 | Hollingshead et al. | |
| 8,244,507 B2 | 8/2012 | Hollingshead et al. | |
| 2008/0111813 A1* | 5/2008 | Gatzke et al. | 345/419 |
| 2009/0132215 A1* | 5/2009 | Inoke et al. | 703/2 |

* cited by examiner

*Primary Examiner* — Sean Shechtman
(74) *Attorney, Agent, or Firm* — Kunzler Law Group, PC

(57) ABSTRACT

Certain embodiments of the disclosure provide one or more methods and/or systems to provide for determination of valid fastener zones that meet certain design rules. A method may include selecting at least one fastener having a preselected size and providing a first structural member and second structural member each having preselected sizes and shapes. The method may include determining a first fastener placement zone in the first structural member and determining a second fastener placement zone in the second structural member, where the respective first and second fastener placement zones are determined as a function of the structural design rules. The method may include determining a final fastener zone by identifying an overlap of the first and second fastener zones.

13 Claims, 12 Drawing Sheets

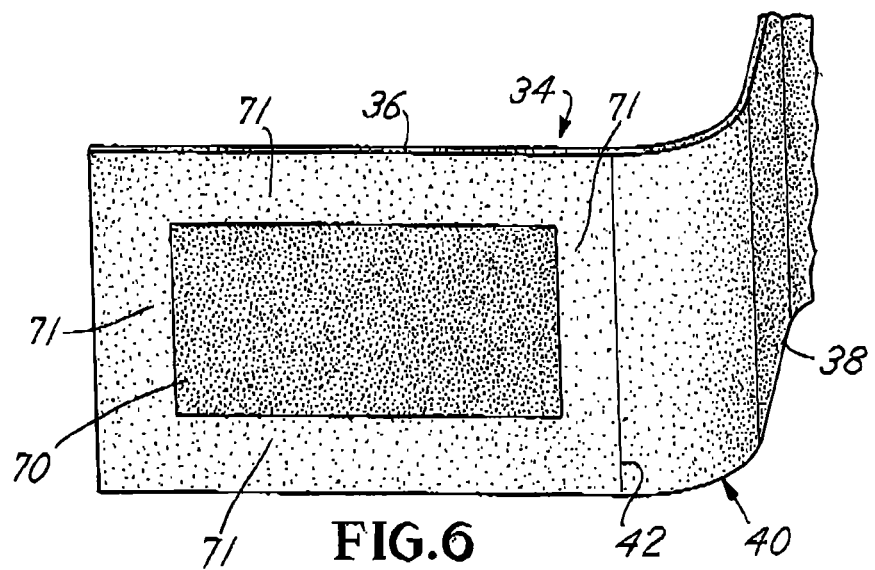
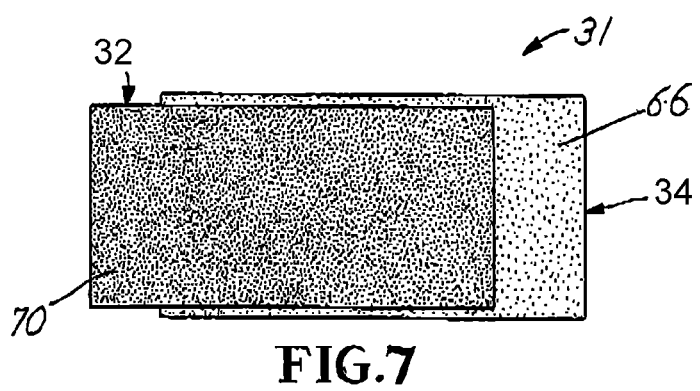
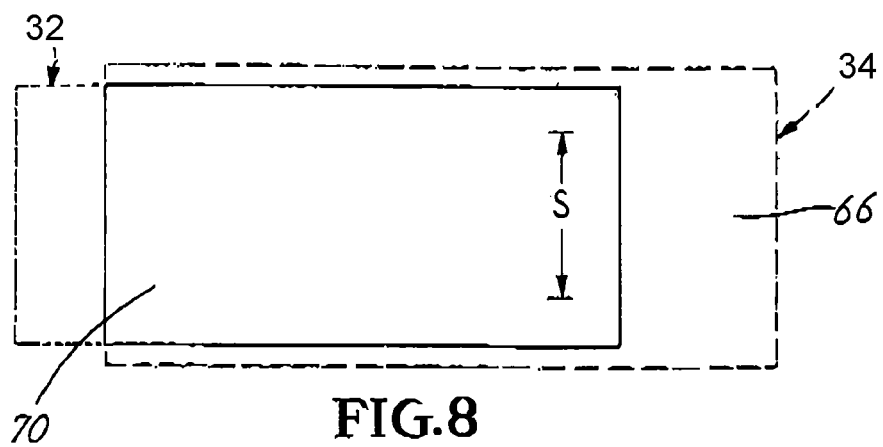

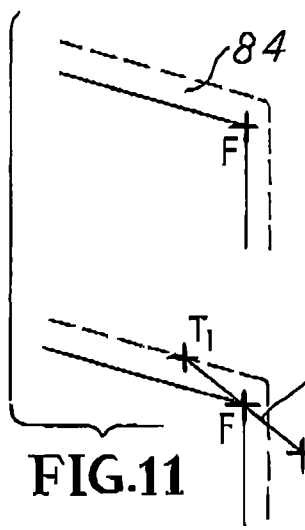
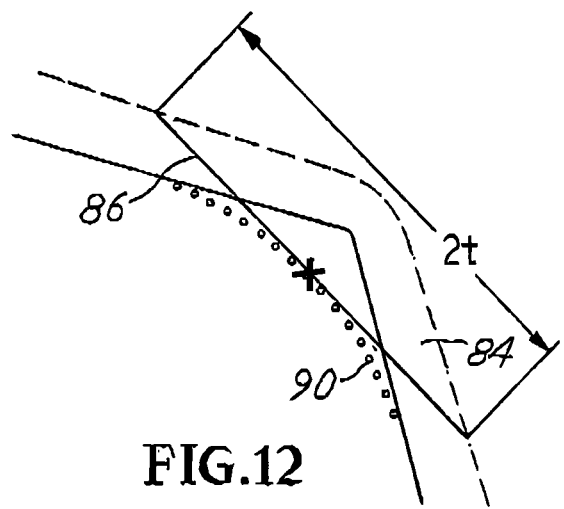
FIG.11  FIG.12
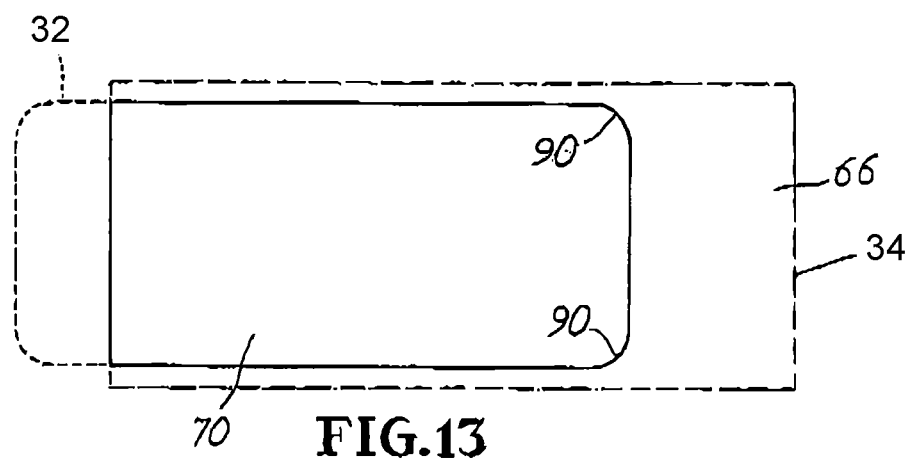
FIG.13
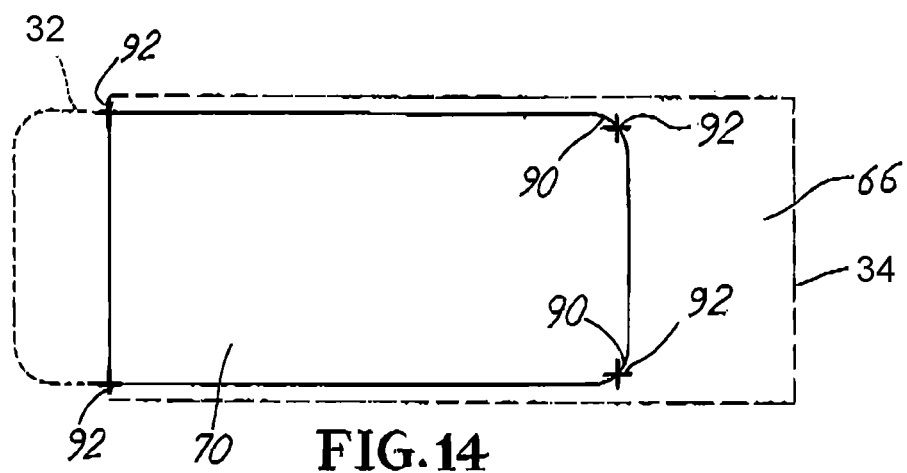
FIG.14

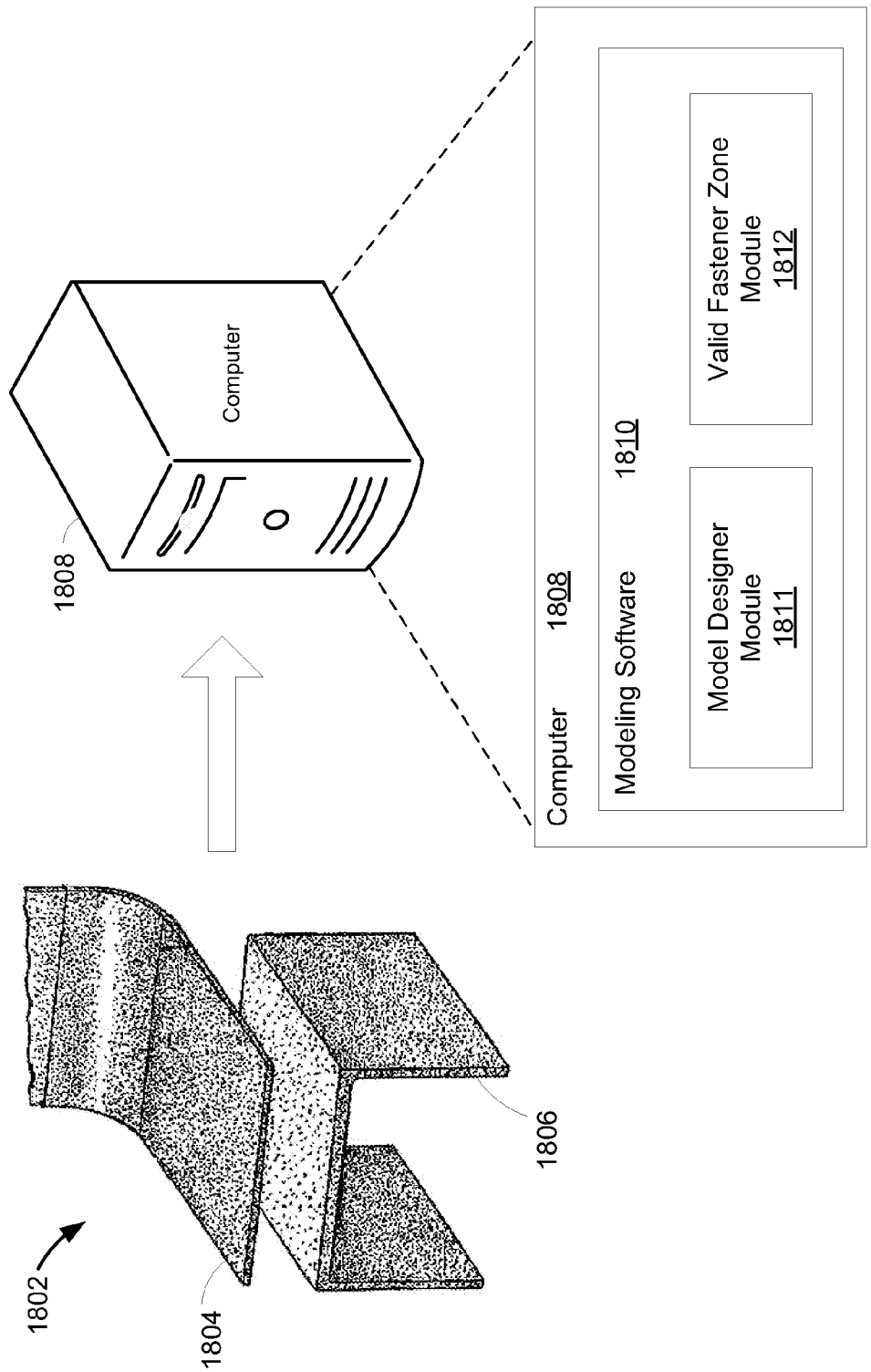

METHOD AND SYSTEM FOR IDENTIFYING FASTENER PLACEMENT ZONES

FIELD

Certain embodiments of the disclosure relate generally to one or more methods and/or systems for identifying fastener placement zones, and more specifically, identifying fastener placement zones in at least two structural parts for later joining the two separate structural parts together to form a mechanical structure or assembly.

BACKGROUND

In various industries such as the aircraft industry and the automotive industry, various structural assemblies may include multiple structural parts that need to be secured together. The structural parts may be secured together utilizing one or more fasteners between the parts. In designing a structural part, an engineer may be required to evaluate several factors that drive the design parameters. This process may be difficult, timely, tedious, costly and/or inaccurate, and/or other problems may arise. For example, various structural parts/assemblies exist, such as those on an airplane, where the combinations of the fastener types that may be used and the potential fastener placement locations may number in the thousands. Further, when securing parts together to form an assembly, certain rules may need to be followed concerning the placement of the fasteners in the assembled parts. Some rules may concern, for example, the placement of fasteners relative to nearby edges, fillets and thickness changes in relation to the holes to be provided for insertion of the fasteners in the assembled parts. The rules may depend on the material type of the structural parts and the type of fastener (e.g., bolts, screws, rivets, studs and the like). Further, the rules may depend on the sizes of the particular fasteners and the spacing between fasteners. Current available methods may involve checking (e.g., to determine whether rules have been followed) the location or potential location of holes (e.g., for fasteners) in a structural part after the location of the hole has been selected or determined. These methods may be referred to as "reactive" solutions. Current available methods do not offer a "proactive" method for determining the optimal placement of fasteners. A method and system using a proactive method is needed which may solve one or more of the existing problems.

Further limitations and disadvantages of conventional and traditional approaches will become apparent to one of skill in the art, through comparison of such systems with some aspects of the present invention as set forth in the remainder of the present application and with reference to the drawings.

BRIEF SUMMARY

Certain embodiments of the disclosure provide one or more methods and/or systems to provide for determination of valid fastener zones that meet certain design rules. One or more embodiments of the present disclosure describe a method for establishing preferred fastener placement zones in a mechanical assembly. The method may include selecting at least one fastener having a preselected size and having an upright central axis. The method may include providing a first structural member and second structural member, each having preselected sizes and shapes. The method may include providing predetermined structural design rules for joining said first structural member and said second structural member with said at least one fastener. The method may include determining a first fastener placement zone in said first structural member and determining a second fastener placement zone in said second structural member, where the respective first and second fastener placement zones may be determined as a function of said structural design rules. The method may include determining a final fastener zone by electronically identifying an overlap of the first and second fastener zones when the first and second structural members are arranged to be joined in a mechanical assembly.

In some embodiments, the at least one fastener, said first structural member and said second structural member are components of an aircraft. In some embodiments, the method includes joining said first structural member and said second structural member using multiple fasteners, each having a preselected size and an upright central axis, where all of said upright central axes may be located within said first and second fastener placement zones. In some embodiments, the method may include providing one or more additional structural members each having preselected sizes and shapes, and determining, for each additional structural member, a fastener placement zone, where the fastener placement zones of the additional structural members may be determined as a function of said structural design rules. In some embodiments, the step of determining the final fastener zone includes electronically identifying an overlap of the fastener placement zones of the additional structural members with the first and second fastener zones.

In some embodiments, the design rules include rules about distances of fasteners from edges of structural members and rules about distances of said fasteners from fillets in structural members. In some embodiments, the first structural member includes a planar or curved portion having a first side and a second side, each of said sides having a one-sided fastener placement zone, the overlapping areas of the one-sided fastener placement zones defining the first fastener placement zone. In some embodiments, a first fastener of said at least one fastener is coupled with a platenut. The platenut may include a longitudinal axis that runs perpendicular to the central axis of the first fastener, a central opening for receiving the first fastener and opposed flanges being spaced along said longitudinal axis. In some embodiment, the method may include locating a corner portion in said final fastener zone, the corner portion having an angled shape, and determining a modified final fastener zone. The corner portion may be rounded, and the central axis of the first fastener may be located substantially within the modified final fastener zone. In some embodiments, the step of determining a modified final fastener zone includes the step of determining a curvature of the rounded corner portion such that the longitudinal axis of the platenut is at a tangent to the curvature.

One or more embodiments of the present disclosure describe a method executed on a data processing system having at least one processor. The method may include loading an assembly model, the assembly model defining a first part and a second part. The first and second parts may be placed and oriented such that a first attachment surface of the first part is positioned to be substantially equidistant to a second attachment surface of the second part. The method may include selecting a fastener type having a size attribute. The method may include specifying fastener placement rules defining geometric constraints on fastener placement locations for the first and second parts. The method may include establishing respective first and second fastener zones on the respective first and second attachment surfaces of the respective first and second parts as a function of the size attribute and the fastener placement rules. The method may include comparing the first and second fastener zones to define an assembly fastener zone that indicates where fasteners of the fastener type may be placed to join the first and second parts into the assembly model. The assembly fastener zone may be defined by at least one overlapping portion of the respective first and second fastener zones when positioned in an equidistant configuration, and as compared from a perspective normal to the first and second fastener zones.

In some embodiments, the fastener placement rules include rules about distances of fasteners of particular sizes from edges of structural members of a model and rules about distances of fasteners of particular sizes from fillets in structural members of a model. In some embodiments, the method includes loading a first fastener model related to the selected fastener type, and receiving placement input from a user to place the first fastener model in the assembly model. Placing the first fastener model may include specifying a location and orientation of the first fastener model relative to the assembly model. In some embodiments, the method may include comparing the placement of the first fastener model to the assembly fastener zone to determine whether placement of first fastener model is acceptable. Placement of the first fastener model may be acceptable if a central axis associated with the first fastener model extends only through the assembly fastener zone. In some embodiments, the method may include loading a first fastener model related to the selected fastener type, and automatically placing the first fastener model in the assembly model. Placing the first fastener model may include determining a location and orientation of the first fastener model relative to the assembly model such that a central axis associated with the first fastener model extends only through the assembly fastener zone. In some embodiments, the method may include receiving input that indicates that a platenut will be used with the first fastener model, and modifying the assembly fastener zone to round one or more corner portions of the assembly fastener zone such that the first fastener and the platenut can be placed in the assembly model without violating any fastener placement rules.

One or more embodiments of the present disclosure describe a system that includes one or more memory units that store multiple virtual models, a virtual model designer coupled to the one or more memory units, and a valid fastener zone indicator coupled to the virtual model designer. The virtual model designer may be configured to load an assembly model, the assembly model defining a first part and a second part. The first and second parts may be placed and oriented such that a first attachment surface of the first part is positioned to be substantially equidistant to a second attachment surface of the second part. The virtual model designer may be further configured to select a fastener type having a size attribute. The virtual model designer may be further configured to specify fastener placement rules defining geometric constraints on fastener placement locations for the first and second parts. The valid fastener zone indicator may be configured to establish respective first and second fastener zones on the respective first and second attachment surfaces of the respective first and second parts as a function of the size attribute and the fastener placement rules. The valid fastener zone indicator may be further configured to compare the first and second fastener zones to define an assembly fastener zone that indicates where fasteners of the fastener type may be placed to join the first and second parts into the assembly model. The assembly fastener zone may be defined by at least one overlapping portion of the respective first and second fastener zones when positioned in an equidistant configuration, and as compared from a perspective normal to the first and second fastener zones.

In some embodiments, the fastener placement rules include rules about distances of fasteners of particular sizes from edges of structural members of a model and rules about distances of fasteners of particular sizes from fillets in structural members of a model. In some embodiments, the virtual model designer is further configured to load a first fastener model related to the selected fastener type, and receive placement input from a user to place the first fastener model in the assembly model. Placing the first fastener model may include specifying a location and orientation of the first fastener model relative to the assembly model. In some embodiments, the virtual model designer may be further configured to compare the placement of the first fastener model to the assembly fastener zone to determine whether placement of first fastener model is acceptable. Placement of the first fastener model may be acceptable if a central axis associated with the first fastener model extends only through the assembly fastener zone. In some embodiments, the virtual model designer may be further configured to load a first fastener model related to the selected fastener type, and automatically place the first fastener model in the assembly model. Placing the first fastener model may include determining a location and orientation of the first fastener model relative to the assembly model such that a central axis associated with the first fastener model extends only through the assembly fastener zone. In some embodiments, the virtual model designer may be further configured to receive input that indicates that a platenut will be used with the first fastener model, and modify the assembly fastener zone to round one or more corner portions of the assembly fastener zone such that the first fastener and the platenut can be placed in the assembly model without violating any fastener placement rules.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF SEVERAL VIEWS OF THE DRAWINGS

Several features and advantages are described in the following disclosure, in which several embodiments are explained, using the following drawings as examples.

FIG. 6 is an isometric top view of the foot showing the valid fastener zone of the foot.

FIG. 7 shows the overlaid valid fastener zones of the foot and the standoff.

FIG. 8 shows the overlaid valid fastener zone shown in solid lines.

FIG. 11 shows the corner of a valid fastener zone illustrating there may be no way to fit the two platenut tack rivets on the two parts.

FIG. 12 shows where a fastener center point can go and have the tack rivets of a platenut in a valid position.

FIG. 13 shows rounded corners where a fastener can be placed without the tack rivets violating edge distance rules.

FIG. 14 shows curves that replace vertices in the right side of FIG. 14 with fastener center points placed 50% along the length of the curves.

FIG. 18 depicts a block diagram showing example devices, components, software, modules and interactions of a system that may be used to implement the one or more computer-implemented methods for identification of valid fastener zones.

DETAILED DESCRIPTION

Figure 1:
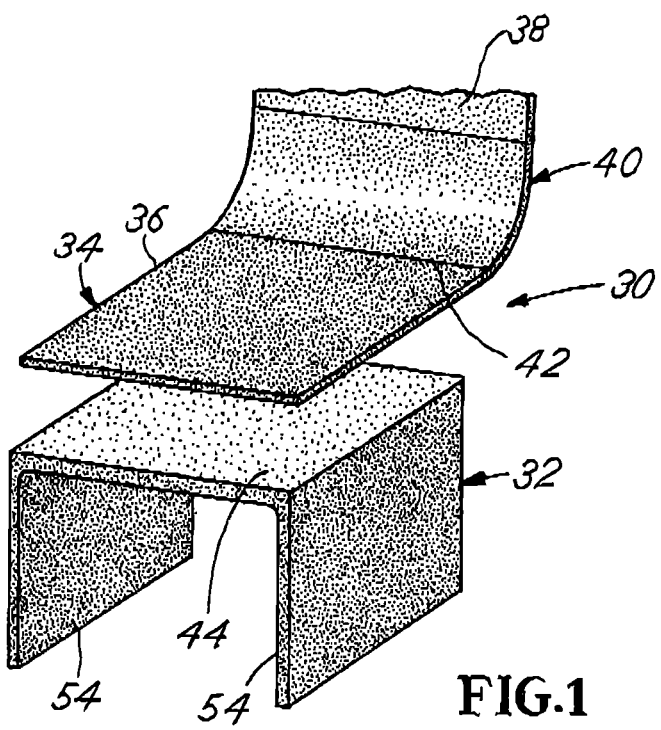
FIG. 1 is an isometric view of the two parts (the standoff and the foot), shown separated in a vertical direction prior to being secured together for mounting in a major structure.

Certain embodiments of the disclosure provide one or more methods and/or systems to initially provide for determination of correct, valid fastener zones that meet the rules as discussed above and any other similar rules in various industries. One or more embodiments describe a proactive procedure (e.g., as opposed to a reactive procedure) for identifying the preferred fastener placement zones for later interconnecting one or more parts with one or more fasteners. The presently described methods and/or systems differ from current reactive approaches, since they involve a proactive way to provide for correct fastener placement. In other words, current methods provide for a system for checking a fastener location, but do not provide an initial determination of the valid fastener placement zones of two or more parts being interconnected by one or more fasteners. The description as follows is not to be considered in a limiting sense, but is provided for the purpose of illustrating general principles of the claimed and described method and system or apparatus.

A method provides for the initial identification of valid fastener placement zones for attaching two or more structural parts together. At least one fastener is provided that has a preselected size and type and has an upright central axis. A first structural member and a second structural member are provided. Each of the structural members has a preselected size and shape, and the members are capable of being secured together by at least one fastener. Certain preselected structural design rules for components of the structural member are known in order to provide valid fastener locations on the two structural members. With these rules, the method is involved in determining a first of the valid fastener placement zones in said first structural member. Similarly, with these rules, a second of the valid fastener placement zones is provided for said second structural member. Each of said valid zones follows the structural design rules.

By identifying the areas of the structural members to be secured together, and by knowing the upright central axis of the fastener, the upright central axis of a fastener is provided for placement within the valid fastener placement zone of each of the structural members. Ultimately, the central axis defines the location of a hole for the ultimate and later passage of a fastener there through, for ultimately securing the first and second structural members together, thereby forming an assembly generally which would be used as part of an assembled larger structure. Such a larger structure may include an airplane or any type of aircraft, but is not be limited to such a usage.

It is to be understood that multiple fasteners each having a preselected size and central upright axis may be utilized with the method. Furthermore, although the description to follow generally shows only two structural members, it is to be understood that multiple structural members having multiple interconnected parts and locations can be provided and multiple fasteners may be utilized for joining two or more structural members together to form a mechanical part which may or may not be used in assembled larger structure. All of the fasteners will be placed within the valid fastener zone (sometimes hereinafter referred to as a "VFZ") of each of the structural members of a future assembly.

It is common in various manufacturing facilities that there are certain rules concerning placement of fasteners within the parts of the assembly, including rules about distances of the placement of fasteners from edges of each of the structural members, rules about distances between fasteners being used to assemble parts together, and rules about distances from other areas, such as fillets commonly found in structural members.

A method and an apparatus or system of the disclosure may utilize one or more computers and computer software to carry out any of the disclosed steps in identifying the locations or potential locations of one or more of the holes to be identified by the disclosed method, system and/or apparatus involved herein.

Figure 15:
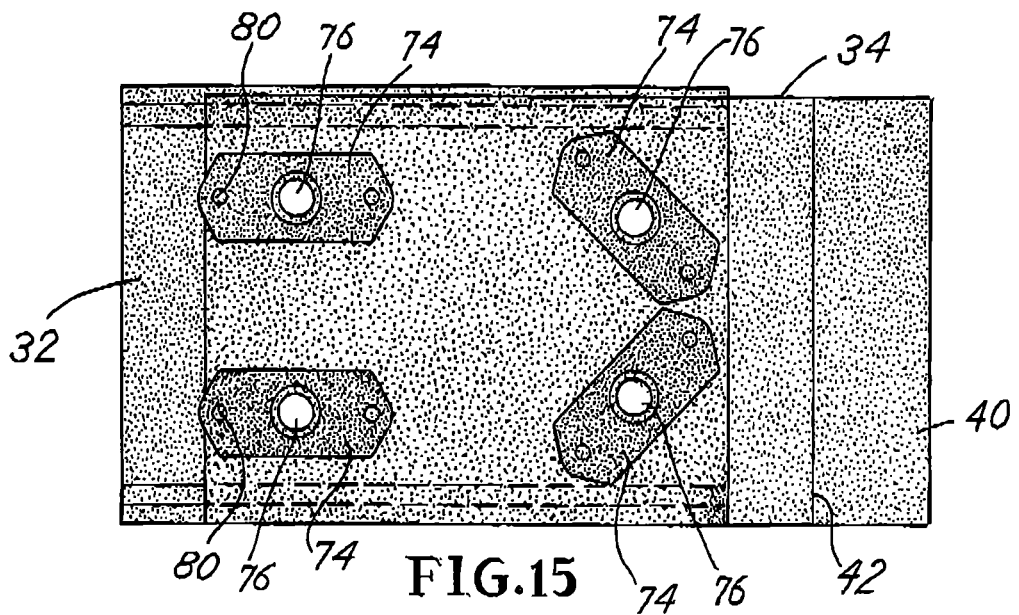
FIG. 15 shows the top view of holes and platenuts placed in the valid zone using the method of FIG. 14.
Figure 16:
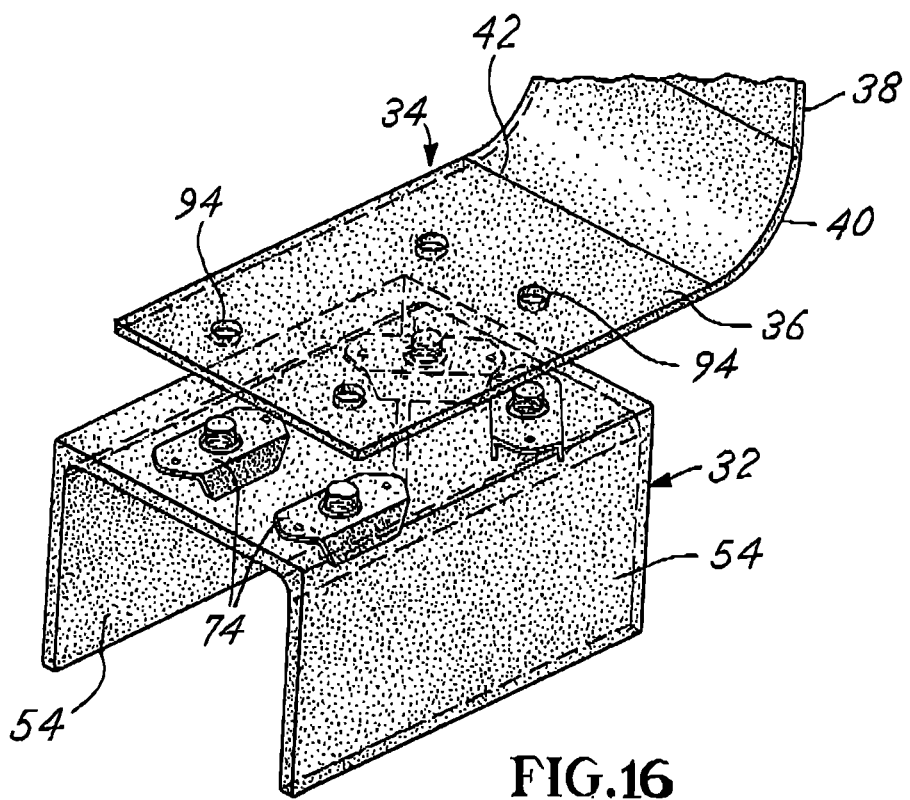
FIG. 16 is an isometric view of placed holes and platenuts.

As discussed above, there are many assemblies that are composed of one or more structural parts to create an assembly or subassembly used in the manufacture of a larger structural assembly, such as an aircraft (not shown) or the like, such as automobiles. FIG. 1 is an illustration of two spaced illustrative parts, generally 30, of a future subassembly of two parts which, for purposes of simplicity, will be referred to as the standoff, generally 32, and the foot, generally 34, which make up the later interconnected assembly 31, as seen in FIGS. 15 and 16. The lower structural member shown in FIG. 1 and additional Figures may at times be referred to as a "standoff" while the upper structural part may be referred to as a "foot". These two parts, when assembled, may be in a major structure, such as an aircraft, including an airplane (not shown) or other mechanical structures such as automobiles. In FIG. 1, the foot member 34 has a planar portion 36, a generally broken-off upright portion 38, interconnected by an arcuate shaped fillet portion, generally 40. It is important to note that, in FIG. 1, there is an imaginary demarcation or boundary line 42 where the curved fillet 40 becomes tangent to the planar portion 36. The line 42 and the planar portion 36 are positioned, prior to assembly, above the planar portion 44 of the standoff 32. The planar portion 44 of the standoff 32 is designed with at least a partial overlap with the planar portion 36 of the foot 34.

Figure 2:
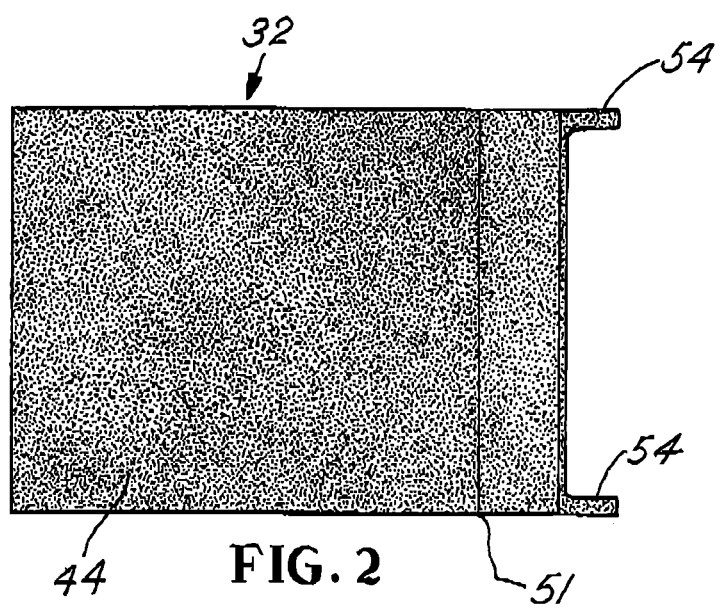
FIG. 2 is a top view of the standoff of FIG. 1, in a slightly tilted position, with an inset line near the right hand edge of the standoff.

Referring to FIG. 2, an imaginary demarcation or boundary line 51 is spaced inwardly from the right hand edge of the upper planar portion 44 of the standoff 32. The standoff 32 includes unitary spaced support legs 54 which extend downwardly from the opposite lateral edges of the upper planar portion 44. The planar portion 44 of the standoff 32 is generally positioned directly beneath the planar portion 36 of the foot 34. The line 51 defines the location to the left where fasteners can be placed validly, that is, where they can be placed and not have an increased risk of structural failure. The distance from the right hand edge of the upper face of the planar portion 44 of the standoff 32 is determined by rules relating to fastener size, edge condition and material type of construction of the standoff 32.

Figure 3:
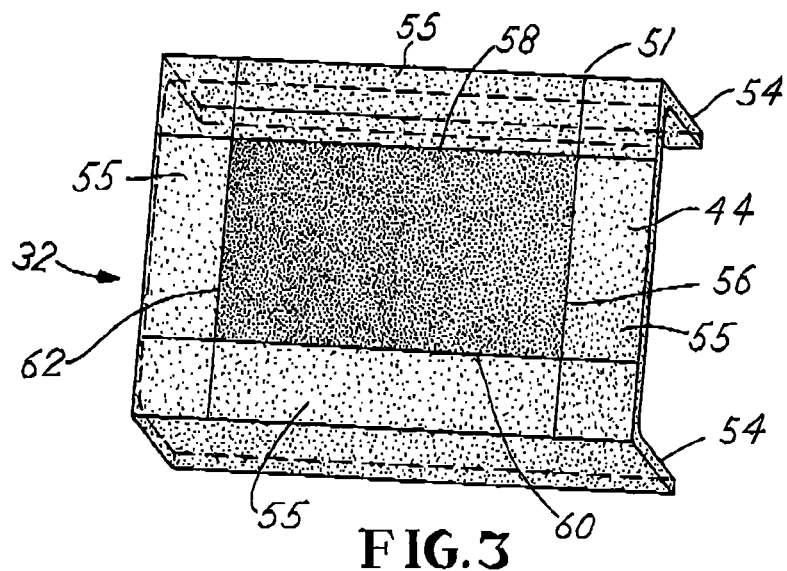
FIG. 3 is an isometric view of the top face of the standoff, illustrating insets around the free edges thereof, showing the valid fastener zone on the top face thereof.

Referring to FIG. 3, this view is similar to FIG. 2 showing the top face of the standoff 32. Insets 55 are required not only on the right hand edge, but also on the top, bottom and left hand edges for defining the valid zone 56 of the top face of the standoff 32. The boundary lines 58 and 60 and the left side boundary line 62 are spaced from the outer edges of the standoff 32 generally using the same fastener placement rules as the demarcation or boundary line 51. The valid fastener zone 56 in darkly shaded view defines the valid fastener zone only with respect to the top face.

Figure 4:
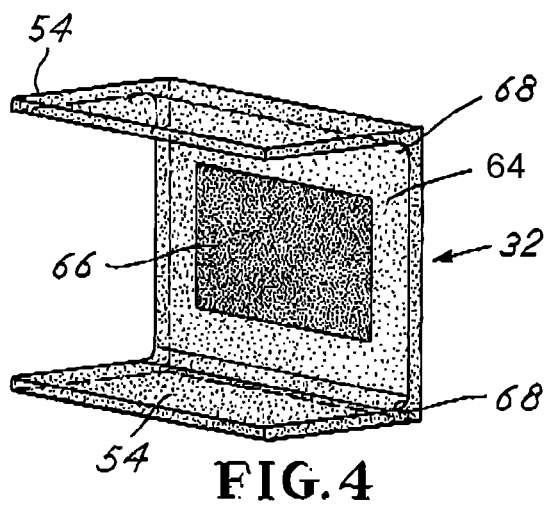
FIG. 4 is an isometric view of the bottom face of the standoff wherein the centermost shaded area shows the valid fastener zone of the bottom face.

Referring now to FIG. 4, the standoff 32 is shown in a rotated position resting on one of the legs 54 for purposes of illustrating the lower face 64 of the standoff 32. The top and bottom boundary lines for the valid fastener zone 66 for the bottom face 64 are different from the upper face in view of the different rules for fillets.

Figure 5:
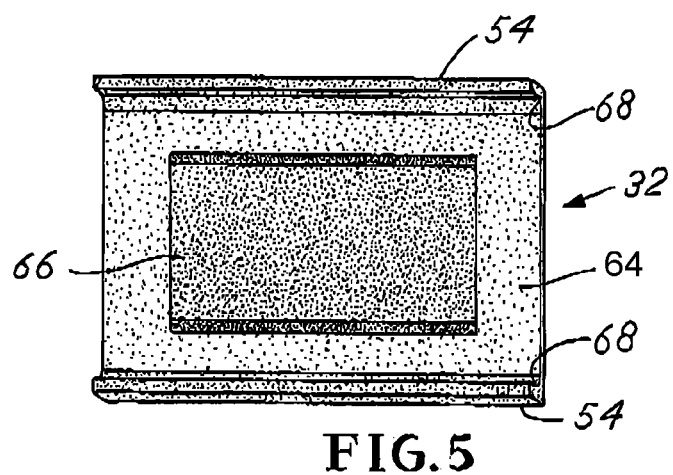
FIG. 5 is a slightly tilted view of the standoff showing the combined valid zone of the standoff in the centermost shaded area.

Referring to FIG. 5, this upward view shows the valid fastener zone from the bottom face 66 and the valid fastener zone from the top face 56 is slightly darker. Fillets 68 are provided at the intersections of each leg 54 with the lower face 64 of the standoff 32. The meeting lines of the fillets 68 with the lower face 64 cause the valid fastener zone 66 of the lower face to have both longitudinal sides moved laterally inwardly towards each other from both longitudinal sides. Therefore the zone 66 is slightly less in width relative to the upper valid zone 56.

In summary, the final valid fastener zone 66 for the standoff 32 is as shown in FIG. 5. This final accepted fastener valid zone 66 will be identified by a unique identifier and the information stored in a computer assisted design system. Other such design information of other parts are identified and stored in a similar computer assisted design system.

A similar valid fastener valid zone can be created in a similar manner for the foot 34. Referring to FIG. 6, the foot 34 is shown with the central darkened valid fastener zone 70. The foot 34 has upper and lower faces. Therefore, insets 71 are provided from the edges and from the demarcation line 42 of the foot 34 which defines the valid fastener zone 70 for the entire foot 34.

Figure 9:
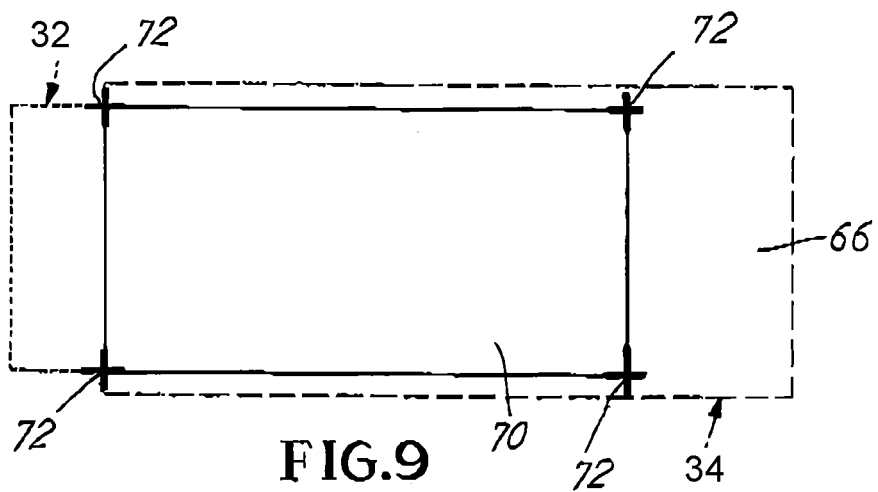
FIG. 9 shows FIG. 8 with representation of possibly placing fastener center lines at the vertices.

Referring to FIGS. 7, 8 and 9, the combined valid fastener zones of the two structural members, that is, the standoff 32 and foot 34, are shown. Referring to FIG. 7, the valid zones are shown overlaid, one on the other, with the valid fastener zone 70 of the standoff 32 shown in dark shading and the valid fastener zone 66 of the foot 34 shown in light shading. This illustrates that placing fasteners in what has been determined to be a valid fastener zone requires consideration of the valid fastener zone of the other part, that is, in the standoff 32. The valid zone 70 of the foot 34 extends beyond one lateral edge of the valid zone of the standoff.

Referring to FIG. 8, there is a schematic showing of the valid fastener zone 66 of the foot 34 overlaid on the valid fastener zone 70 of the standoff 32 in position for being interconnected by fasteners. The solid line indicates the combined valid zone for both parts while the dotted lines indicate tentative valid zones from the two parts and shows that the valid zone for one part is not a valid zone for both parts together. "S" shown in FIG. 8 represents the minimum required spacing between fasteners of the chosen size. There is a valid zone for at least two fasteners between the upper and lower overlapped valid zones. Along the longest side of the overlapping valid zone of the standoff 32 and foot 34, multiple fasteners may be used.

Because there are a small number of vertices, there is a possibility of placing fastener center lines at the vertices. In this regard, refer to FIG. 9 wherein center lines of the fasteners are indicated by the center lines 72.

Maintaining the fastener zone avoids duplicate work should the placement of the fasteners need to be modified and this allows for a simple visual check. By showing zones and fastener pierce points, a stray point for a fastener not in any zone will stand out. This is an easier and more thorough check than redoing the geometric construction for each suspect pierce point.

Figure 10:
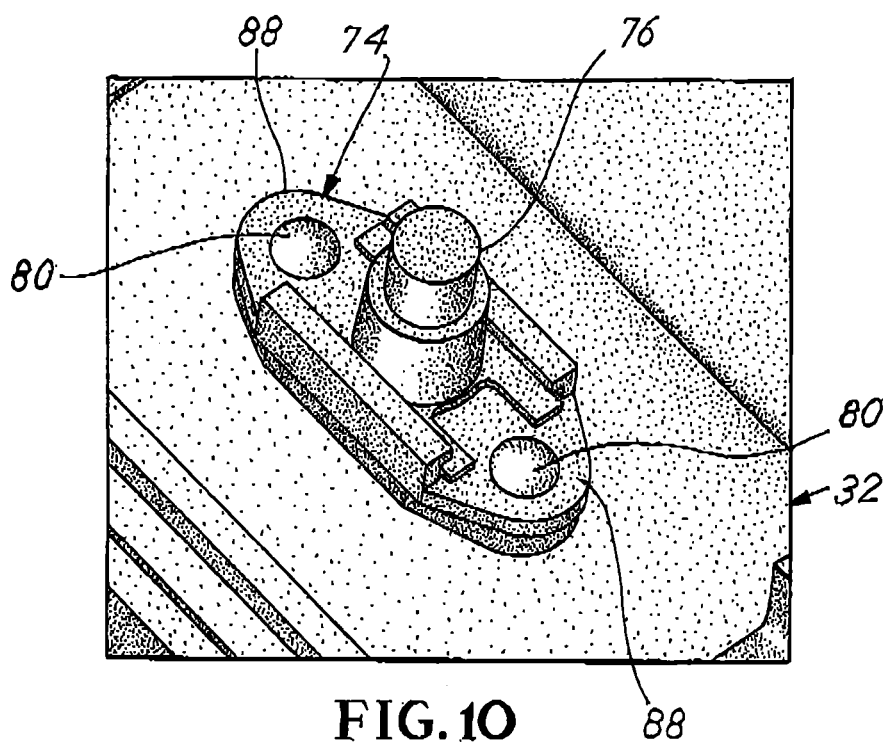
FIG. 10 illustrates a platenut that may be used with the standoff and foot shown in the above figures.

Referring to FIG. 10 there is shown a platenut 74 that may be needed under certain conditions. For example, the platenut 74 may make removing and reinstalling the foot 34 on the standoff 32 easier. The placement of the fastener may need to be modified to account for tack rivets 80 to be used to attach the platenut 74 to the standoff 32 through openings provided in the flanges 88 of the platenut 74. As shown in FIG. 10, the use of tack rivets 80 to secure the platenut 74 to the standoff 32 must meet the existing rules about separation of the tack rivets from edges and fillets. The platenut 74 has a fastener center 76.

Referring to FIG. 11, at the upper portion thereof, the dark line represents a valid fastener zone for the main fastener while the dotted line represents the boundary of a valid fastener zone 84 for tack rivets in the standoff 32. The lower figure shows a representation of the center line 86 of the platenut 74. The center line 86 identifies where tack rivets T1, T2 are to secure the platenut 74 to the standoff 32. Although the center point for a tack rivet T1 is in a valid location since it is within the tack rivet valid fastener zone 84, the center point T2 for a tack rivet is outside any valid zone.

In order to provide for a valid zone for using a platenut 74 in a location shown in FIG. 11, reference is now being made to FIG. 12. In this view, there is a dotted curve 90. The dotted curve 90 defines the portion to the left as being part of the valid zone while the portion to the outside of curve 90 is not a valid zone. The platenut center line 86 is shown as a tangent to the dotted curve 90. It is seen that both tack rivets 80 now will have center points that are within the valid zone as described above. "t" is the distance from the center point 76 of the platenut 74 to the center point of a tack rivet 80.

Referring to FIG. 13, this should be compared to FIG. 8. It is seen that the corners 90 on the valid zone are now rounded. The rounded corners show the valid zone for the use of a platenut 74 as described above relative to FIG. 12.

Referring to FIG. 14, the center point 92 for fasteners as shown, with two center lines for fasteners at the left corners of the valid zone and two center lines at the right side are positioned at the central points 92 of the curved corners 90.

Referring to FIG. 15, there is shown a representation of four platenuts 74 mounted on the standoff 32 with the two platenuts angled at the right edge of the standoff with the center lines of the platenuts angled in the manner shown in FIG. 12, The center line thereof is resting as a tangent against the curved corners. The other two fasteners are mounted validly in a longitudinal position on the standoff 32.

Finally, referring to FIG. 16, there is an isometric view that shows the holes 94 placed in the foot for reception of centers 76 of each of the platenuts 74. The holes 94 are provided in the foot and are aligned with the centers 76 in order that a bolt is passed through each of the holes 94 for securement of the foot 34 to the standoff 32.

With the above description that refers to FIGS. 1-16, it is to be understood that although the method may be carried out manually, it is preferable that the method as described may be carried out by utilizing a computer and software as well as other related devices for initially checking the suitability of hole locations for fasteners for interconnecting the two parts, namely, the standoff 32 and foot 34. Furthermore, reference is made to U.S. Pat. No. 8,244,507 B2 which is preferably utilized for determining which parts and faces of a subassembly or assembly need to have valid fastener zones created for use during the manufacturing process.

Figure 17A:
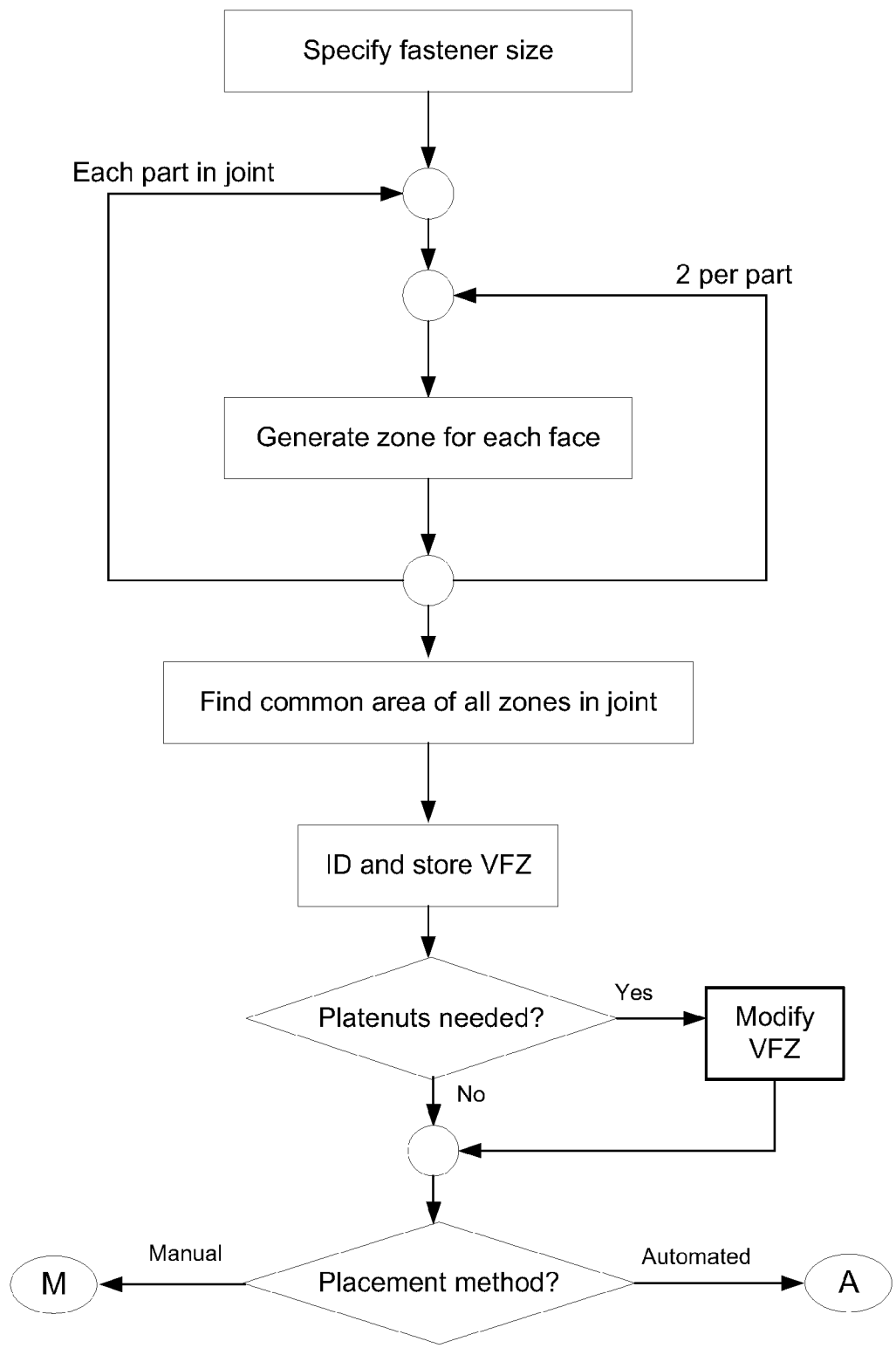
FIGS. 17A and 17B depict a general flow diagram of the method and system to be described below.

Referring to FIG. 17A, there is provided a flow diagram further explaining the method as described above and which may be computer assisted design. As shown in FIG. 17A, a first step of the process includes specifications of the fasteners, including the diameter of the fastener or fasteners to be used in joining one or more parts together. The dimensions of each structural part are entered into the computer with an identification of the adjacent surfaces to be joined together. Each part must also identify the opposite, non-joined surfaces, in the manner discussed above. In the area entitled "Generate Zone for Each Face," the rules of construction for the parts to be joined together by the fastener or fasteners have been stored, that is, those rules relating to edges and fillets. The next step in the process is to find the common areas of all zones in the joined parts. Each combined zone is then provided with a unique identification and this information is stored in the computer regarding potential valid fastener zones. The valid fastener zone is then stored for ultimate use, whether by manual placement or by automatic placement and for visual or automated checking.

Figure 17B:
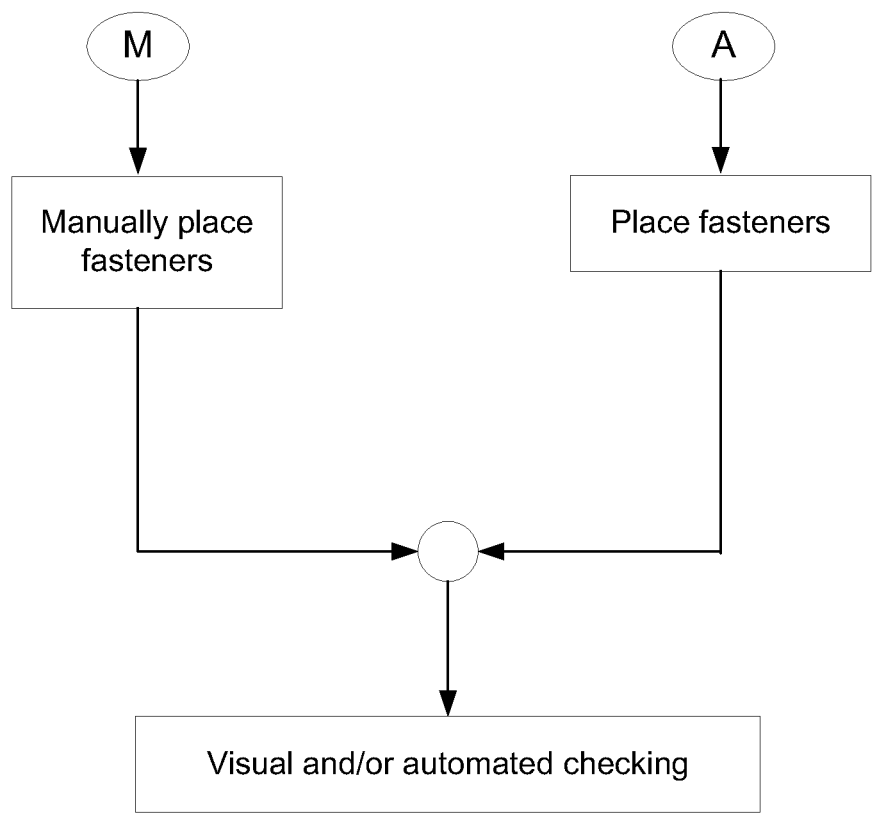

Referring to FIG. 17B, if the fasteners are to be manually placed, the valid fastener zones are identified and the fasteners are manually placed. If the fasteners are to be automatically placed, the fasteners are automatically placed at this point. The system also enables subsequent visual and/or automated checking to determine appropriate locations of the fasteners and the respective valid fastener zones.

Certain embodiments of the present disclosure may be found in one or more computer-implemented methods and/or systems for identification of valid fastener zones (VFZs). FIG. 18 depicts a block diagram showing example devices, components, software, modules and interactions of a system that may be used to implement the one or more computer-implemented methods for identification of valid fastener zones (VFZs). FIG. 18 depicts an assembly 1802 and a computer 1808. Assembly 1802 may include multiple parts, for example parts 1804 and 1806. Assembly 1802 is just one example of an assembly, and it should be understood that the description provided herein may apply to various other types and shapes of assemblies and/or parts. In the example of FIG. 18, assembly 1802 may be similar to the assembly shown in FIG. 1, such that part 1806 may be described as a standoff and part 1804 may be described as a foot.

Computer 1808 may be any type of data processing system that includes at least one processor and at least one memory unit and is capable of executing code to run various software programs, modules, operations, routines and the like. Computer 1808 may be configured with various modules, components and the like that may perform various steps and routines involved in determining valid fastener zones. For example, computer 1808 may include modeling software 1810, which may further include a model designer module 1811 and a valid fastener zone module 1812. Various descriptions herein may describe one or more of these modules as performing various tasks; however, it should be understood that in some embodiments, one or more of the steps or routines performed by one of these modules may be performed partially or wholly by one or more of the other modules.

Computer 1808 may include, have installed thereon and/or run modeling software 1810. Modeling software 1810 may be a computer aided design (CAD) software program. CAD software programs may aid in the design of virtual objects (e.g., 3D models) or virtual models that are based on real world objects or are designed to create real world objects. CAD software programs may utilize vector-based drafting programs and three dimensional solid and surface modeling programs. As one example, a user may interact with computer 1808 to in turn interact with modeling software 1810 to design a virtual assembly (e.g., a 3D assembly model) that is based on real world assembly 1802 (or a desired assembly 1802). A user may design virtual parts (e.g., 3D part models) that are based on the real world or desired parts 1804 and 1806. Once a user creates a model of assembly 1802 and/or parts 1804, 1806, the model(s) may be saved for later use. For example, a model may be used to send to a fabrication center, such that the fabrication center can use the model as a guide to fabricate the assembly.

Models created by modeling software 1810 may contain detailed information about various aspects of the model. For example, the information may include geometric details (e.g., structure, surfaces, bends, corners, flange, etc.), dimensions (e.g., lengths, widths, thicknesses, etc.), materials (e.g., metal, fiberglass, graphite epoxy or other composite material), processing notes, product identifications and other suitable information. Once a model of an assembly (e.g., assembly 1802) has been created and saved, a designer may use modeling software 1810 to load or recall the model in order to alter the model, make additions to the model, and the like. As one example, a designer may load a model of the assembly in order to specify where certain holes should be added for fasteners and/or to specify the fasteners used (e.g., size, type, location, etc.).

Modeling software 1810 may include one or more modules, functions, features, routines or the like that are designed to aid a designer in designing or altering a model. For example, modeling software 1810 may include a model designer module 1811. In some embodiments, the model designer module 1811 may allow a designer to create models as described above, and may allow a designer to alter models that were previously created. The model designer module 1811 may provide a designer with a main design "stage" where the designer can create or load a model, view the model, move or resize the model and the like. The model designer module 1811 may provide a user with menus, toolbars, options and the like that may aid a designer in creating or altering a model. The model designer module 1811 may interface with various tools, add-ons, or other modules. In this respect, the model designer module 1811 may provide a designer with an interface to use these tools, add-ons or modules to aid in designing or altering a model. One example of an add-on or tool may be the valid fastener zone module 1812, which may aid a designer to add or place fasteners in a model that the designer is viewing or altering via the model designer module 1811.

Modeling software 1810 may include one or more modules, functions, features routines or the like that are designed to aid a designer in placing fasteners. For example, modeling software 1810 may include a valid fastener zone (VFZ) module 1812. VFZ module 1812 may be a feature, add-on, tool or the like of a modeling software program or CAD software program. For example, the VFZ module 1812 may be an option that is selectable via a menu, button or the like. As another example, the VFZ module 1812, if installed and activated, may run automatically when a designer performs a relevant action with respect to the modeling software. For example, if the designer loads a model of an assembly and selects a fastener to add to the model, the VFZ module 1812 may run automatically.

The VFZ module 1812 may provide guidance to a designer regarding valid placement of fasteners. In order to perform various routines to provide fastener guidance, the VFZ module 1812 may include or maintain one or more rules files. A rule file may specify various rules that must be followed when determine where a fastener may be placed on a model. The rules in the rules files may include some or all of the rules explained herein regarding valid fastener placement, and perhaps other rules. For example, rules may relate to fastener size, edge condition of a part and material type of a part, etc.

Figure 19A:
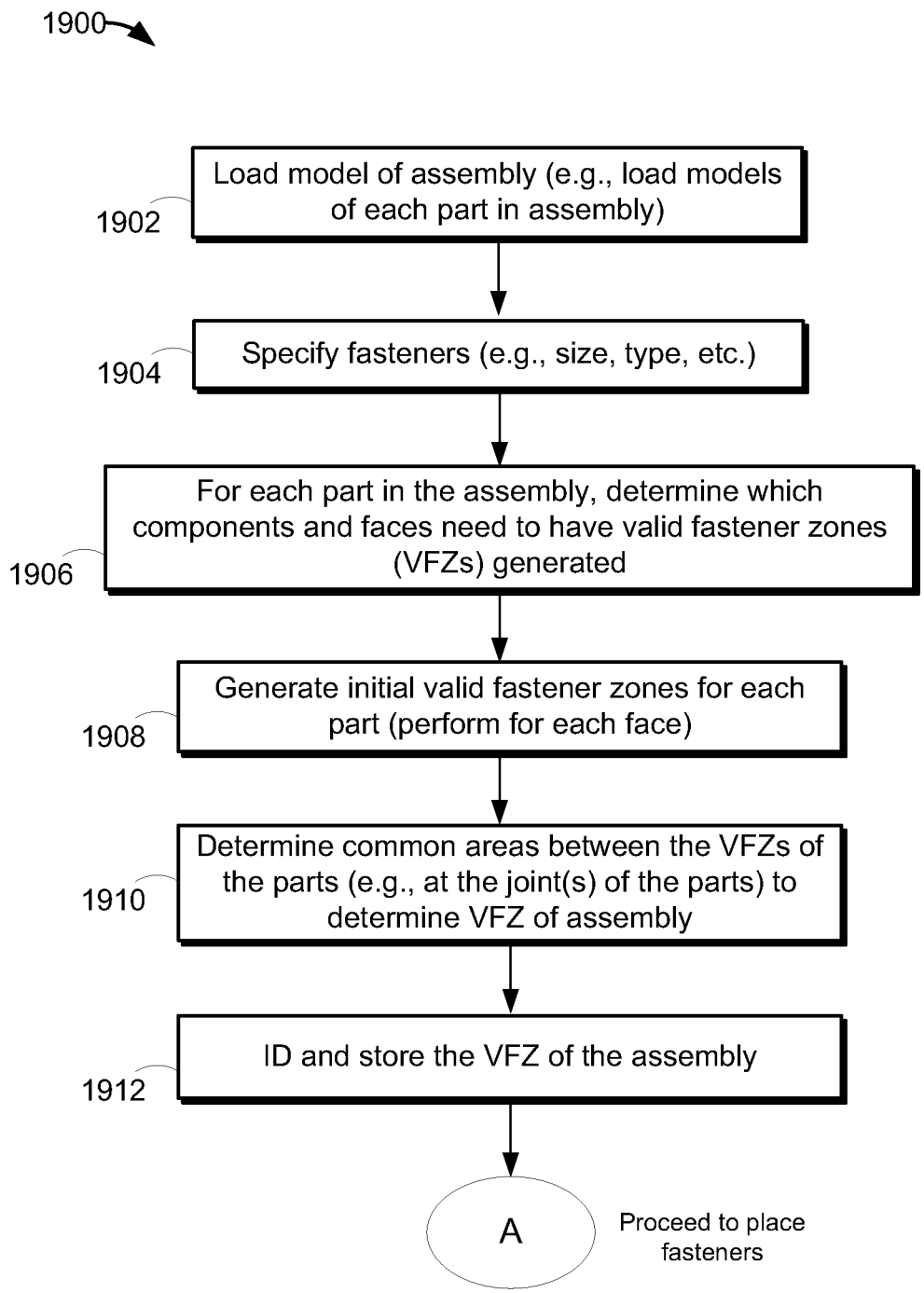
FIGS. 19A and 19B depict a flow diagram that shows example steps in a computer-implemented method for identification of valid fastener zones.
Figure 19B:
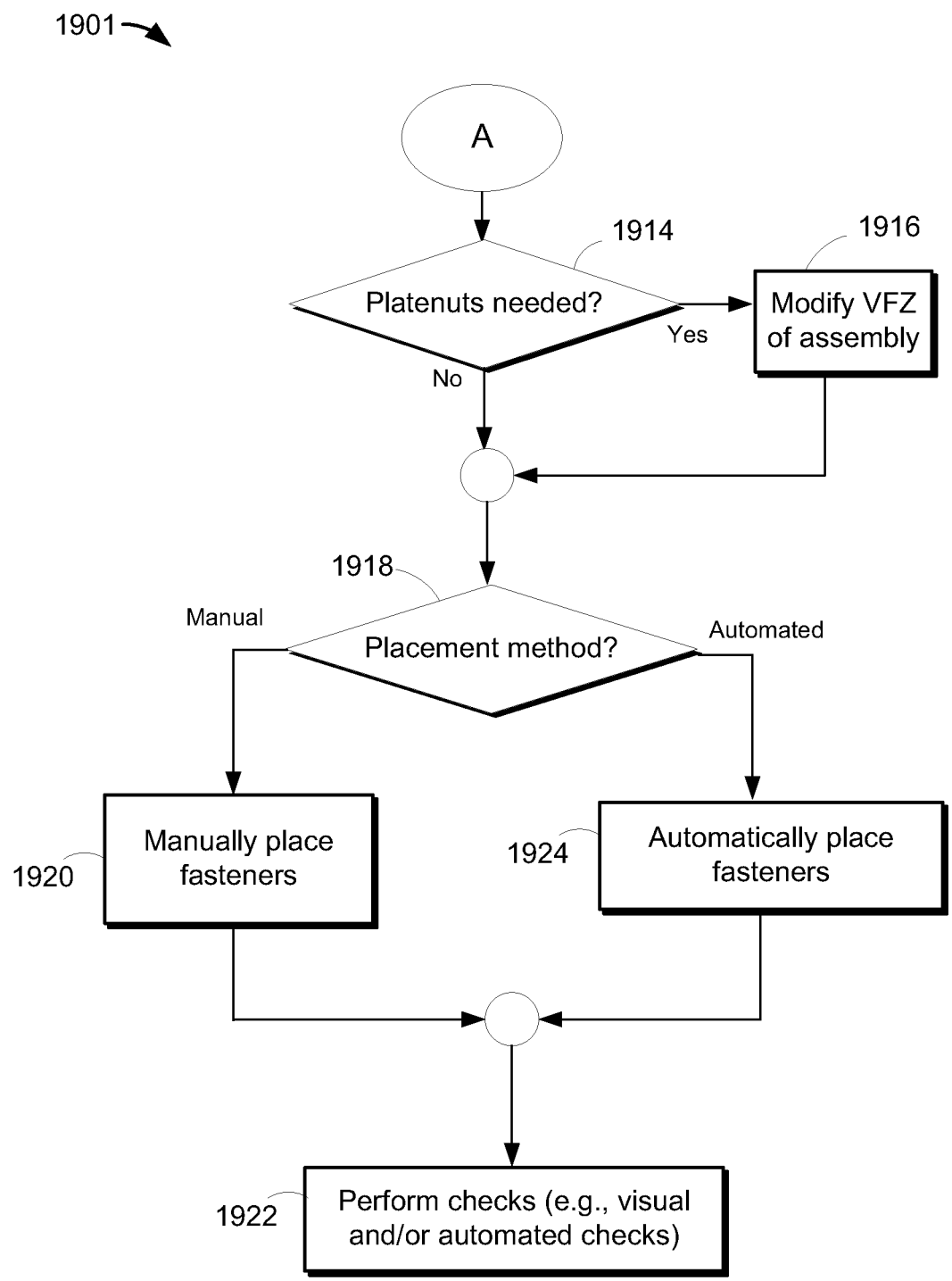

FIGS. 19A and 19B depict a flow diagram (with parts 1900 and 1901) that shows example steps in a computer-implemented method for identification of valid fastener zones, in accordance with one or more embodiments of the present disclosure. With respect to the various methods described herein and depicted in associated figures, it should be understood that, in some embodiments, one or more of the steps described and/or depicted may be performed in a different order. Additionally, in some embodiments, a method may include more or fewer steps than are described and/or depicted. At step 1902, a model of an assembly may be loaded, for example, into a modeling software program. For example, a designer may interact with a computer to load a model that was previously designed and saved. The model may have been designed based on a real world assembly or may have been designed (e.g., based on drawings) with the intent of creating a real world assembly based on the model. In order to load the assembly model into the modeling software, a designer may load a model of the entire assembly (e.g., including multiple parts) or the designer may load models of individual parts.

At step 1904, the designer may specify the fasteners that the designer intends to use, for example, specifying the size and/or the type of fastener. The various fasteners available to a designer may be represented by various fastener models. Each fastener model may include information about various aspects or attributes of the fastener. For example, the information may include a size, a type of fastener (e.g., a ¼ inch rivet), included hardware (e.g., a washer placed relative to the fastener) and other suitable information. In some embodiments, when a fastener is placed in the model of the assembly (or when its placement is estimated, e.g., at step 1906), the model of the fastener may be updated with additional information about which zone (e.g., which VFZ) it is associated with. This fastener location information may be updated at later steps of the flow chart, for example, when fasteners are placed after the VFZ of the assembly has been determined, or when it is specified that platenuts will be used. This fastener location information may be used to perform later checks.

At this point a valid fastener zone (VFZ) module may be selected or may run automatically when it detects that a fastener was selected. In some embodiments, the VFZ module may perform the majority of the steps remaining in the flow diagram. In general, the VFZ module will aid a designer in creating valid fastener zones in the assembly.

At step 1906, one or more routines (e.g., included in the VFZ module) may be used or performed to determine information about the parts of the assembly that may be affected by a fastener. For example, a user may indicate the approximate location and orientation of a fastener that the user intends to place, and the VFZ module may determine which parts of the assembly the fastener may touch or run through. Additionally, the VFZ may determine which components (e.g., a leg of first part, and a flange of a second part) and/or zones of each part may be affected by the fastener. As one example, a flange of a part may be touched or run through by a fastener, and therefore the VFZ module may narrow its focus to this particular flange component of the part. Additionally, the VFZ may determine which faces of each part/component may be affected by the fastener. For example, if a particular face of the flange component is touched or run through by a fastener, the VFZ module may narrow its focus to this particular flange component and this particular face. These routines may analyze the approximate placement of the fastener and may extend lines from the placement locations to determine parts, components, surfaces, zones, and the like that may be affected by fasteners. One example of such a routine may be found in U.S. Pat. No. 8,244,507. In this respect, after step 1906, the VFZ module may have narrowed its focus to particular components and faces of each part, and then step 1908 may further narrow the focus to determine valid fastener zones for the pertinent components and faces. One benefit of narrowing the components and faces of a part before determining the valid fastener zones (e.g., using various design rule as discussed herein) of a part may be to reduce the number of components of a part that needs to be analyzed by the VFZ module.

At step 1908, the VFZ module may generate initial valid fastener zones (VFZs) for each part of the assembly. The VFZ module may analyze the assembly model (e.g., analyzing the various parts, the geometry of the parts, the dimensions of the parts, etc.) and the size of the fastener to be used, and may apply various rules as described herein to determine the valid fastener zones for each part. The VFZ module may utilize one or more routines as was described with regard to step 1906 in order to reduce the number of components/areas/faces of each part that the VFZ module needs to consider before performing this analysis. It should be understood however, that in some embodiments, the VFZ module may analyze the assembly model from scratch (e.g., without using a routine that indicates affected components, faces, etc.).

After step 1908 is performed, the VFZ module may have determined one or more VFZs for each part of the assembly, for example, VFZs that are included in components of each part that may touch to form a joint when the assembly is constructed. As one example, after step 1908 is performed on the assembly of FIG. 1, an initial VFZ may be designated for the standoff part, as shown in FIG. 5, and an initial VFZ may be designated for the foot part, as shown in FIG. 6. As is explained herein, a VFZ may need to be determined for each face of a component (e.g., see the description related to FIG. 3 and FIG. 4), for example, a top face and a bottom face. In this respect, the initial VFZ of each part of the assembly may be a zone that is common to multiple faces (e.g., a top face and a bottom face as shown in FIG. 5).

At step 1910, the VFZ module may determine a VFZ of the assembly, for example, VFZs that are included in components of each part that may touch to form a joint when the assembly is constructed. In order to determine the VFZ of the assembly, the VFZ module may analyze the initial VFZs of each part. Each part of the assembly may be oriented and aligned relative to each other as they will be when the assembly is constructed, for example, with a joint being formed where two parts of the assembly touch. In this respect, the initial VFZ of the parts may overlap, and the VFZ module may determine the common area between the overlapping initial VFZs, for example, as is explained with respect to FIGS. 7-8.

After step 1908 is performed, the VFZ module may have determined one or more VFZs for the assembly. The VFZ of the assembly may be indicated via the modeling software such that a designer can visually see the VFZ. For example, the VFZ may be highlighted in a color that is different than the color the assembly model. At this step, the VFZ of the assembly indicates areas where fasteners (e.g., fasteners of the size that were indicated at step 1902) may be placed (e.g., unless platenuts are to be used). According to the VFZ of the assembly, a designer may be reasonably confident that if the designer places fasteners in the VFZ, the fastener locations will not violate any of the placement rule described herein. At step 1912 the VFZ of the assembly may be assigned a unique ID and may be stored for future reference. In this respect, if another part is to be attached to the same assembly, a new assembly VFZ may be determined and assigned a different ID. Additionally, the VFZ may be identified and analyzed later to perform various checks. At this point, the VFZ module may proceed to subsequent steps that relate to placing fasteners in the assembly model (see oval A that is common to FIGS. 19A and 19B).

FIG. 19B includes additional example steps in a computer-implemented method for identification of valid fastener zones, in accordance with one or more embodiments of the present disclosure. More specifically, the steps of FIG. 19B relate generally to the placement of fasteners in an assembly model. When reference is made to "placing fasteners" in a model, this may refer to the process adding models of particular fasteners to the model of the assembly, and positioning the fastener models at locations and orientations as they will be placed when the assembly is constructed. Placing a fastener may also include designating one or more holes (e.g., in the parts of the assembly) that the fastener will pass through or fit into.

At step 1914, the VFZ module may determine whether platenuts are to be used for one or more of the fasteners. This determination may be made before placement method determination (step 1918), or alternatively, after. The descriptions provided herein (e.g., descriptions with regard to FIG. 10) may describe why platenuts may be used. At step 1916, the VFZ of the assembly may be modified if platenuts are to be used. The description provided herein (e.g., with regard to FIGS. 11-15) may describe how the VFZ of the assembly may be modified to accommodate platenuts.

At step 1918, a placement method may be designated. For example, a designer may select which placement method the designer prefers, or the VFZ module may consult a configuration file that indicates which placement method should be used. One example placement method may be manual placement. Manual placement may include a designer interacting with the modeling software to place a model of a fastener at a position and orientation in the assembly model. As one example, a designer may "grab" (e.g., by clicking and holding a mouse) a fastener model and may "drag" the model into place. Various other mouse gestures may be used by the designer to orient and fine tune the placement of the fastener. This manual placement process may be repeated for various other fasteners. At step 1920, if manual placement is selected, a designer may manually place one or more fasteners in the assembly model. The designer may take care to place each fastener within the VFZ of the assembly.

At step 1918, another example placement option/method may be automated placement. Automated placement may refer to various routines (e.g., performed by the VFZ module) that may analyze the assembly model and the VFZ of the assembly, and may automatically select the placement of one or more fasteners.

At step 1924, one or more fasteners may be automatically placed. The VFZ module may analyze the assembly model and the VFZ of the assembly, and may automatically select the placement of one or more fasteners. The VFZ module may consider information about the assembly model when placing fasteners, for example, the number of fasteners required for a particular surface area, thickness, type of material, etc. Once the fasteners are automatically placed, each fastener may appear in the model of the assembly, for example, such that a designer can see the location and orientation of each fastener. At this point, the designer may be able to manually alter the placement and/or orientation of one or more of the fasteners. In this respect, the designer may auto place the fasteners and then manually modify the placement if needed.

At various points in the flow chart of FIG. 19B, the VFZ module may perform various checks (e.g., automated checks) or allow a designer to perform various checks (e.g., visual checks). For example, checks may be performed at step 1922 and/or at other points in the flow chart. As one example of a check that may be performed, the VFZ module may analyze each fastener (e.g., it fastener model and associated information), and may determine the latest placement information (e.g., which zone the fastener is related to). The VFZ module may then analyze the actual placement location of the fastener with respect to the latest updated VFZ of the assembly, and may check to determine whether the fastener is still appropriately located within the VFZ. More specifically, a comparison may be made between "pierce points" of fasteners as placed and valid fastener zones. For example, if a fastener centerline does not fall in the proper zone, the VFZ module may generate a warning, or the model that represents the fastener can be displayed in a color that is different than the color of the overall assembly model. This method for performing checks and confirming design quality could be performed either by an interactive process, or by an automated process (e.g., one that runs in batch mode).

Once various fasteners have been placed in the model of the assembly, the model may be sent to a fabricator that may create the physical assembly, including the individual pieces. A fabricator may use the fastener locations in the model to add or include the holes for the fasteners at the point of fabrication.

The methods, routines and techniques of the present disclosure, including the example methods and routines illustrated in the flowcharts and block diagrams of the different depicted embodiments may be implemented as software executed by one or more data processing systems that are programmed such that the data processing systems are adapted to perform and/or execute part or all of the methods, routines and/or techniques described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example, in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 20:
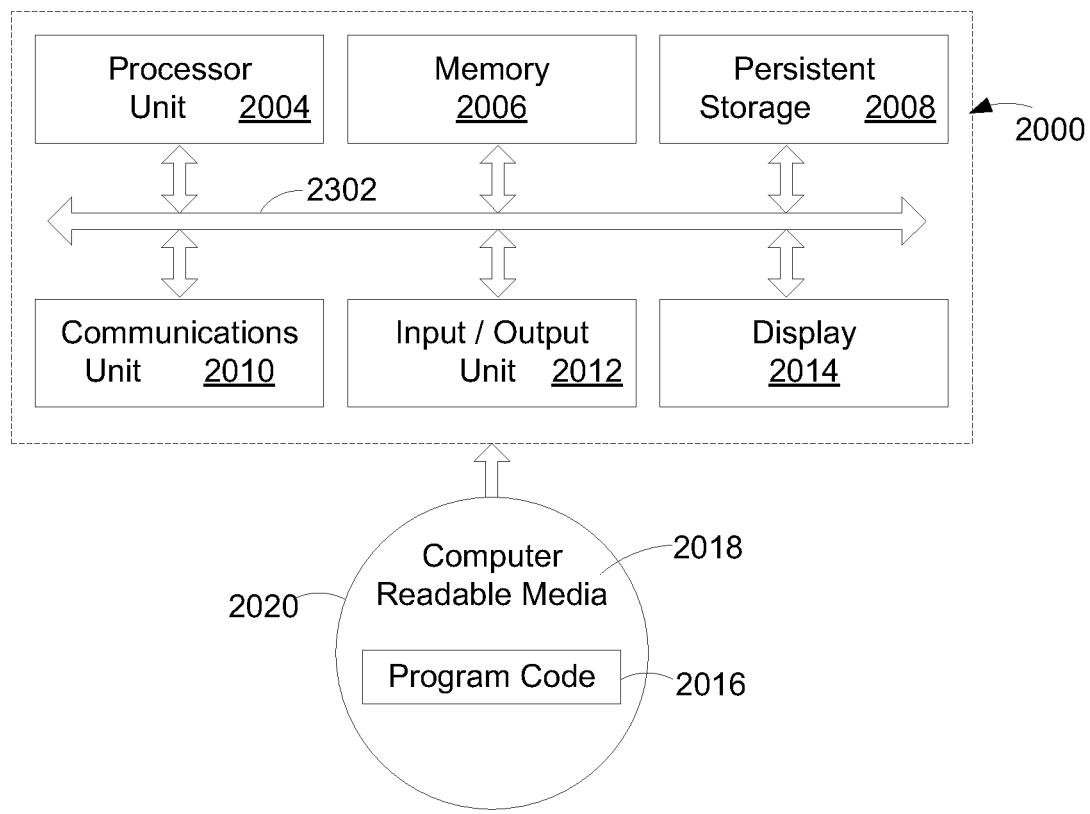
FIG. 20 depicts a block diagram of an example data processing system that may be used to implement one or more embodiments of the present disclosure.

FIG. 20 depicts a block diagram of an example data processing system 2000 that may be used to implement one or more embodiments of the present disclosure. For example, referring also to FIG. 21 momentarily, computer 2108 may take the form of a data processing system similar to data processing system 2000 of FIG. 20. Referring to FIG. 20, data processing system 2000 may be used to execute, either partially or wholly, one or more of the methods, routines and/or solutions of the present disclosure, for example, the method(s) described with regard to FIGS. 19A and/or 19B. In some embodiments of the present disclosure, more than one data processing system may be used to implement the methods, routines, techniques and/or solutions described herein.

In the example of FIG. 20, data processing system 2000 may include a communications fabric 2002 which provides communications between components, for example a processor unit 2004, a memory 2006, a persistent storage 2008, a communications unit 2010, an input/output (I/O) unit 2012 and a display 2014. A bus system may be used to implement communications fabric 2002 and may be comprised of one or more buses such as a system bus or an input/output bus. The bus system may be implemented using any suitable type of architecture that provides for a transfer of data between different components or devices attached to the bus system.

Processor unit 2004 may serve to execute instructions (for example, a software program) that may be loaded into the data processing system 2000, for example, into memory 2006. Processor unit 2004 may be a set of one or more processors or may be a multiprocessor core depending on the particular implementation. Processor unit 2004 may be implemented using one or more heterogeneous processor systems in which a main processor is present with secondary processors on a single chip. As another illustrative example, processor unit 2004 may be a symmetric multi-processor system containing multiple processors of the same type. In some embodiments, a processor unit similar to processor unit 2004 may be programmed to execute, either partially or wholly, one or more of the methods, routines and/or solutions of the present disclosure, for example, the method(s) described with regard to FIGS. 19A and/or 19B. In some embodiments, a processor unit similar to processor unit 2004 may be programmed to effect one or more software programs and/or modules described herein, for example, modeling software 2110, model designer module 2111 and/or valid fastener zone module 2112.

Memory 2006 may be, for example, a random access memory or any other suitable volatile or nonvolatile storage device. Memory 2006 may include one or more layers of cache memory. Persistent storage 2008 may take various forms depending on the particular implementation. For example, persistent storage 2008 may contain one or more components or devices. For example, persistent storage 2008 may be a hard drive, a solid-state drive, a flash memory or some combination of the above. In some embodiments, a memory similar to memory 2006 may store computer code that may be executed by a processor unit to execute, either partially or wholly, one or more of the methods, routines and/or solutions of the present disclosure, for example, the method(s) described with regard to FIGS. 19A and/or 19B. In some embodiments, a memory similar to memory 2006 may store computer code that may be executed by a processor unit to effect one or more software programs and/or modules described herein, for example, modeling software 2110, model designer module 2111 and/or valid fastener zone module 2112. In one or more embodiments, a memory similar to memory 2006 may store one or more virtual objects or virtual models that are based on real world objects, for example, real world object/assembly 2102. The modeling software may then access the virtual objects/models from the memory.

Instructions for an operating system may be located on persistent storage 2008. In one specific embodiment, the operating system may be some version of a number of known operating systems. Instructions for applications and/or programs may also be located on persistent storage 2008. These instructions may be loaded into memory 2006 for execution by processor unit 2004. For example, the methods and/or processes of the different embodiments described in this disclosure may be performed by processor unit 2004 using computer implemented instructions which may be loaded into a memory such as memory 2006. These instructions are referred to as program code, computer usable program code or computer readable program code that may be read and executed by a processor in processor unit 2004.

Display 2014 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 2012 allows for input and output of data with other devices (e.g., a keyboard and/or mouse) that may be connected to data processing system 2000. Input/output devices can be coupled to the system either directly or through intervening I/O controllers.

Communications unit 2010 may provide for communications with other data processing systems or devices, for example, via one or more networks. Communications unit 2010 may be a network interface card. Communications unit 2010 may provide communications through the use of wired and/or wireless communications links. In some embodiments, the communications unit may include circuitry that is designed and/or adapted to communicate according to various wireless communication standards, for example, WiFi standards, Bluetooth standards and the like.

The different components illustrated for data processing system 2000 are not meant to provide architectural limitations to the manner in which different embodiments may be implemented. The different illustrative embodiments may be implemented in a data processing system including components in addition to or in place of those illustrated for data processing system 2000. Other components shown in FIG. 20 can be varied from the illustrative examples shown.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present invention not be limited to the particular embodiments disclosed.

The invention claimed is:

1. A method executed on a data processing system having at least one processor, the method comprising:
    loading a virtual assembly model, the virtual assembly model defining a first part and a second part, wherein the first and second parts are placed and oriented such that a first attachment surface of the first part overlaps a second attachment surface of the second part;
    selecting a fastener type having a size attribute;
    specifying fastener placement rules defining geometric constraints on fastener placement locations for the first and second parts, and
    establishing respective first and second fastener zones on the respective first and second attachment surfaces of the respective first and second parts as a function of the size attribute and the fastener placement rules; and comparing the first and second fastener zones to define an assembly fastener zone that indicates where fasteners of the fastener type may be placed to join the first and second parts into the virtual assembly model, wherein, the assembly fastener zone is defined by at least one overlapping portion of the respective first and second fastener zones when the first attachment surface of the first part is positioned over the second attachment surface of the second part, and as compared from a perspective normal to the first and second fastener zones, and visually indicating the assembly fastener zone on at least one of the first and second attachment surfaces of the virtual assembly model.

2. The method of claim 1, wherein the fastener placement rules include rules about distances of fasteners of particular sizes from edges of structural members of a model and rules about distances of fasteners of particular sizes from fillets in structural members of a model.

3. The method of claim 1, further comprising:
loading a first virtual fastener model related to the fastener type; and
receiving placement input from a user to place the first virtual fastener model in the virtual assembly model, where placing the first virtual fastener model includes specifying a location and orientation of the first virtual fastener model relative to the virtual assembly model.

4. The method of claim 3, further comprising comparing the placement of the first virtual fastener model to the assembly fastener zone to determine whether placement of the first virtual fastener model is acceptable, placement of the first virtual fastener model being acceptable if a central axis associated with the first virtual fastener model extends only through the assembly fastener zone.

5. The method of claim 1, further comprising:
loading a first virtual fastener model related to the fastener type; and
automatically placing the first virtual fastener model in the assembly model, where placing the first virtual fastener model includes determining a location and orientation of the first virtual fastener model relative to the assembly model such that a central axis associated with the first virtual fastener model extends only through the assembly fastener zone.

6. The method of claim 5, further comprising:
receiving input that indicates that a platenut will be used with the first virtual fastener model; and
modifying the assembly fastener zone to round one or more corner portions of the assembly fastener zone such that the first virtual fastener model and the platenut can be placed in the assembly model without violating any fastener placement rules.

7. The method of claim 1, wherein indicating the assembly fastener zone comprises graphically displaying the assembly fastener zone in the virtual assembly model in a color that is different than the color of the virtual assembly model.

8. A system, comprising:
one or more memory units that store multiple virtual models;
a virtual model designer coupled to the one or more memory units,
wherein the virtual model designer is configured to load a virtual assembly model, the virtual assembly model defining a first part and a second part, wherein the first and second parts are placed and oriented such that a first attachment surface of the first part overlaps a second attachment surface of the second part, and wherein the virtual model designer is further configured to select a fastener type having a size attribute, and wherein the virtual model designer is further configured to specify fastener placement rules defining geometric constraints on fastener placement locations for the first and second parts; and a valid fastener zone indicator coupled to the virtual model designer, wherein the valid fastener zone indicator is configured to establish respective first and second fastener zones on the respective first and second attachment surfaces of the respective first and second parts as a function of the size attribute and the fastener placement rules, wherein the valid fastener zone indicator is further configured to compare the first and second fastener zones to define an assembly fastener zone that indicates where fasteners of the fastener type may be placed to join the first and second parts into the assembly model, wherein, the assembly fastener zone is defined by at least one overlapping portion of the respective first and second fastener zones when the first attachment surface of the first part is positioned over the second attachment surface of the second part, and as compared from a perspective normal to the first and second fastener zones, and wherein the valid fastener zone indicator graphically displays the assembly fastener zone on at least one of the first and second attachment surfaces of the virtual assembly model in a manner different than the virtual assembly model.

9. The method of claim 8, wherein the fastener placement rules include rules about distances of fasteners of particular sizes from edges of structural members of a model and rules about distances of fasteners of particular sizes from fillets in structural members of a model.

10. The system of claim 8, wherein the virtual model designer is further configured to:
load a first virtual fastener model related to the fastener type; and
receive placement input from a user to place the first virtual fastener model in the virtual assembly model, where placing the first virtual fastener model includes specifying a location and orientation of the first virtual fastener model relative to the virtual assembly model.

11. The system of claim 10, wherein the virtual model designer is further configured to compare the placement of the first virtual fastener model to the assembly fastener zone to determine whether placement of first virtual fastener model is acceptable, placement of the first virtual fastener model being acceptable if a central axis associated with the first virtual fastener model extends only through the assembly fastener zone.

12. The system of claim 8, wherein the virtual model designer is further configured to:
load a first virtual fastener model related to the fastener type; and
automatically place the first virtual fastener model in the virtual assembly model, where placing the first virtual fastener model includes determining a location and orientation of the first virtual fastener model relative to the virtual assembly model such that a central axis associated with the first virtual fastener model extends only through the assembly fastener zone.

13. The system of claim 12, wherein the virtual model designer is further configured to:

receive input that indicates that a platenut will be used with the first virtual fastener model; and modify the assembly fastener zone to round one or more corner portions of the assembly fastener zone such that the first virtual fastener model and the platenut can be placed in the virtual assembly model without violating any fastener placement rules.

\* \* \* \* \*